US008838504B2

(12) United States Patent
Eraker et al.

(10) Patent No.: US 8,838,504 B2
(45) Date of Patent: Sep. 16, 2014

(54) MAP-BASED SEARCH FOR REAL ESTATE SERVICE PROVIDERS

(76) Inventors: David Eraker, Seattle, WA (US);
Michael Dougherty, Seattle, WA (US);
Edward Mark Smith, Woodinville, WA (US); Stephen Eraker, Clackamas, OR (US)

(*) Notice: Subject to any disclaimer, the term of this patent is extended or adjusted under 35 U.S.C. 154(b) by 217 days.

(21) Appl. No.: 12/700,736

(22) Filed: Feb. 5, 2010

(65) Prior Publication Data

US 2010/0145800 A1 Jun. 10, 2010

Related U.S. Application Data

(63) Continuation of application No. 11/154,938, filed on Jun. 16, 2005, now abandoned.

(60) Provisional application No. 60/580,046, filed on Jun. 16, 2004, provisional application No. 60/649,459, filed on Feb. 1, 2005.

(51) Int. Cl.
| G06Q 99/00 | (2006.01) |
| G06Q 50/16 | (2012.01) |
| G06Q 30/02 | (2012.01) |
| G06Q 30/06 | (2012.01) |
| G06F 17/30 | (2006.01) |

(52) U.S. Cl.
CPC .......... *G06Q 50/16* (2013.01); *G06F 17/30241* (2013.01); *G06F 17/3087* (2013.01); *G06Q 30/0251* (2013.01); *G06Q 30/0603* (2013.01)
USPC ........................................................ 705/313

(58) Field of Classification Search
USPC ........................................................... 705/313
See application file for complete search history.

(56) References Cited

U.S. PATENT DOCUMENTS

| 2002/0128857 | A1* | 9/2002 | Lee ................................... 705/1 |
| 2002/0133374 | A1* | 9/2002 | Agoni et al. ...................... 705/2 |
| 2003/0011599 | A1* | 1/2003 | Du .................................. 345/428 |
| 2003/0158786 | A1* | 8/2003 | Yaron et al. ...................... 705/26 |
| 2004/0064334 | A1* | 4/2004 | Nye .................................. 705/1 |
| 2004/0077359 | A1* | 4/2004 | Bernas et al. ............. 455/456.1 |
| 2005/0192930 | A1* | 9/2005 | Hightower et al. ............... 707/1 |
| 2005/0195219 | A1* | 9/2005 | Hirono .......................... 345/619 |

* cited by examiner

*Primary Examiner* — Traci Casler
(74) *Attorney, Agent, or Firm* — P. G. Scott Born; Foster Pepper PLLC

(57) ABSTRACT

A computer system for locating real estate service providers by navigating an aerial image map of a geographic region. The system determines a search region corresponding to the geographic region by use of geospatial information associated with the geographic region. Once the search region is determined, the system searches a database for real estate service providers that are associated with the search region and that satisfy certain predetermined criteria.

14 Claims, 7 Drawing Sheets

MAP-BASED SEARCH FOR REAL ESTATE SERVICE PROVIDERS

CROSS-REFERENCE TO RELATED APPLICATIONS

This application claims the benefit of and is a continuation of U.S. patent application Ser. No. 11/154,938, filed on Jun. 16, 2005, now abandoned, which claims the benefit of U.S. Provisional Patent Application No. 60/580,046, filed Jun. 16, 2004, and U.S. Provisional Patent Application No. 60/649,459, filed Feb. 1, 2005, each of which are incorporated herein by reference.

FIELD OF THE INVENTION

This disclosure relates generally to methods and systems for computerized search of real estate data based on aerial maps and, more particularly, relates to search for real estate service providers.

BACKGROUND OF THE INVENTION

Homeowners and homebuyers have long needed an efficient way to discover and evaluate information about real estate service providers. The typical person finds information about real estate service providers by word of mouth, by checking the classified advertisements section of the newspaper, or perhaps by submitting a text query to an internet search engine, such as Google. None of those methods are completely satisfactory solutions to the problem of finding and selecting a real estate service provider.

Real estate agents are one type of real estate service provider. Real estate agents assist buyers and sellers with the complex process of buying a home. Real estate agents provide property information, sales forms, and generally guide the buyer and seller through the purchasing process. Examples of other real estate service providers are mortgage brokers, banks, inspectors, appraisers, and moving companies.

There is a need for a system that overcomes limitations of the current real estate system, as well as providing additional benefits.

SUMMARY OF THE INVENTION

A brief summary of some embodiments and aspects of the invention are first presented. Some simplifications and omissions may be made in the following summary; the summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the Figures, and from the claims (which follow the detailed description).

Under an embodiment of the invention, a computer user searches for real estate service providers by navigating a viewing window above an aerial image (e.g., satellite photo, etc.) map of a geographic region. The viewing window is contained in a web page displayed in a web browser. After the web page is displaying an aerial map of the desired geographic region, the system determines geospatial information (e.g., latitude, longitude, etc.) corresponding to the geographic region displayed in the viewing window. The system determines, at least in part based on the determined geospatial information, a search region corresponding to the geographic region shown in the viewing window. The system then searches a real estate database for real estate service providers associated with the determined search region. The system may send the search results to the web page, a predetermined email address, a predetermined fax machine, or a predetermined mobile device (by, for example, SMS messaging).

Under another embodiment of the invention, a user searches for real estate service provider information by selecting, in a viewing window of a web page on a client computer display, a satellite image of a geographic region. A real estate server computer receives a search request from application software on the client computer. The search request has geospatial information defining the geographic region displayed in the viewing window. The real estate server computer identifies real estate service providers that have provided real estate services within the geographic region. The real estate server transmits information associated with the identified real estate service providers to the client computer, which presents the real estate service providers to the user. The results can be ranked or ordered according to predetermined criteria. For real estate agents, the predetermined criteria can be the number of closings or showings in the geographic region. Additionally, the system can weight the search results based on how recent the service provider's activity was.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 1:
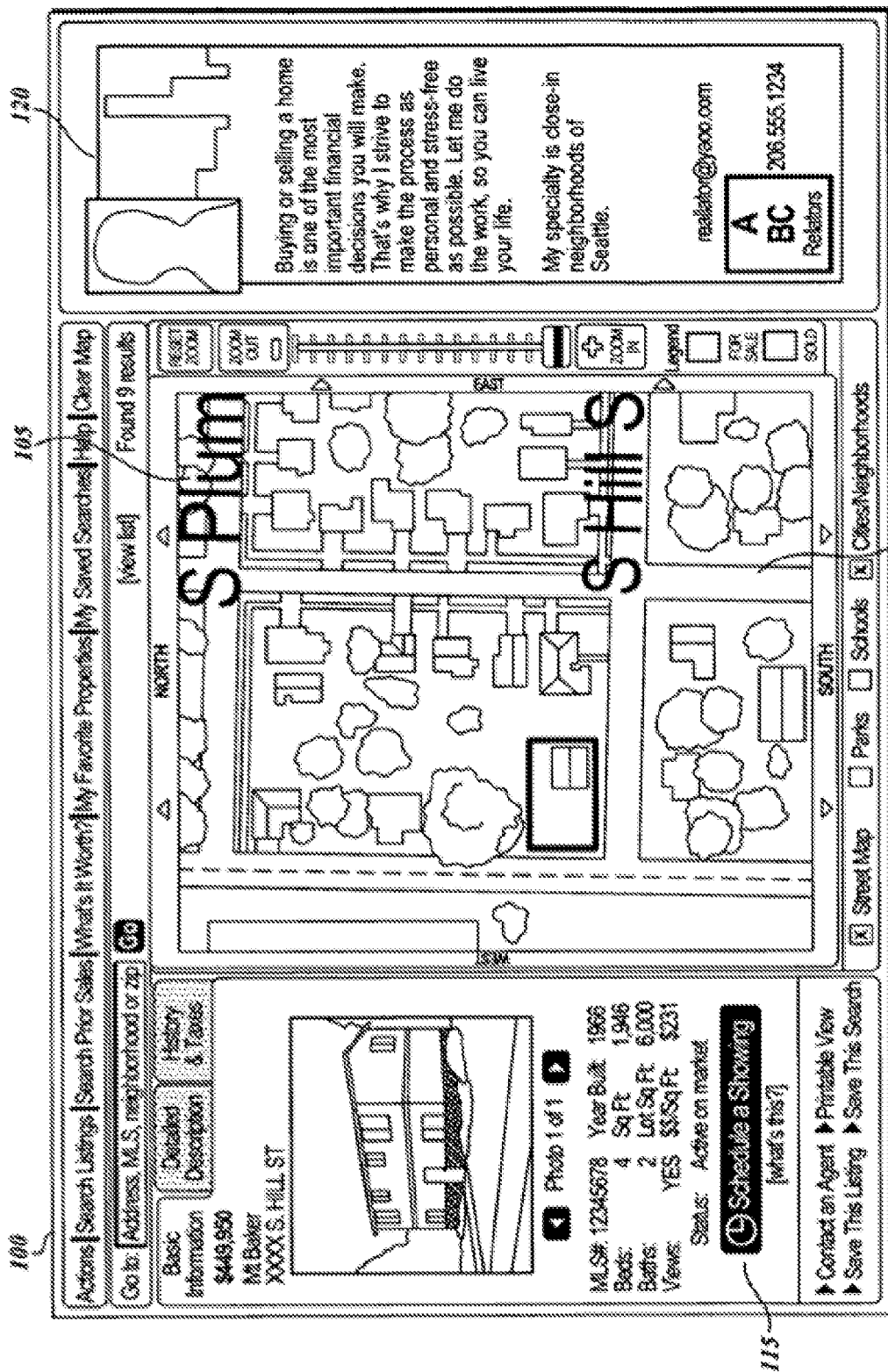
FIG. 1 shows a web page having a typical geographic capture area according to one embodiment of the invention.

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 105 is first introduced and discussed with respect to FIG. 1).

Figure numbers followed by the letters "A," "B," "C," etc. indicate that two or more Figures represent alternative or related embodiments or methods under aspects of the invention.

DETAILED DESCRIPTION OF THE PREFERRED EMBODIMENT

The following description provides specific details for a thorough understanding of, and enabling description for, these embodiments of the invention. However, a person of ordinary skill in the art will understand that the invention may be practiced with many variations and these details do not list every possible variation. In some instances, well known structures and functions have not been shown or described in detail to avoid unnecessarily obscuring the description of the embodiments of the invention.

In one embodiment of the invention, a web site implemented in a computer system allows users to select a geographic region. The web site system identifies and ranks real estate service providers associated with the geographic region. A service provider's ranking is based on predetermined criteria such as the service provider's historical activity in the user-selected geographic region. The web site presents the identified real estate service providers to the user, usually by displaying information on the web page but other delivery methods can be used (such as email).

FIG. 1 shows a web page 100 according to one embodiment of the invention. The web page 100 has a viewing window 105 that "flies" over a satellite image map 110. The user can select various overlays to display on the satellite image map 110. For example, the user can select a "Show Properties" button to cause an overlay layer of properties for sale to be superimposed on the satellite image map 110. As another example, the user can select "Street Map" to have vector-based representations of streets overlaid on the satellite image map 110. When the user wishes to visit a property, the user selects the property on the overlay layer and then selects the Schedule a Showing button 115. In response, the system will provide the user's contact information to the listing broker of the selected property.

Figure 2A:
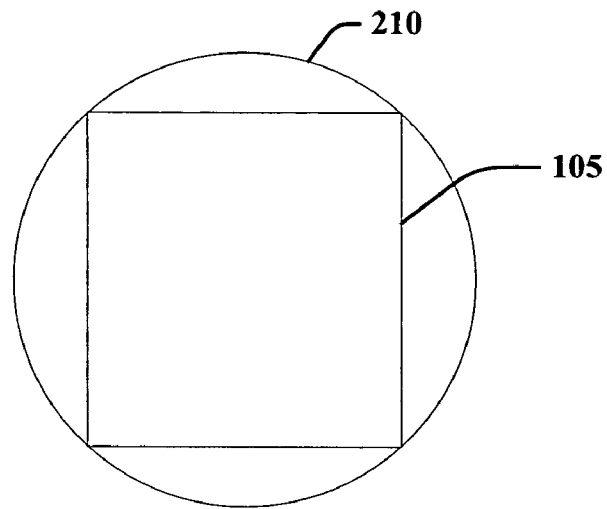
FIGS. 2A-B show various search region geometries.
Figure 2B:
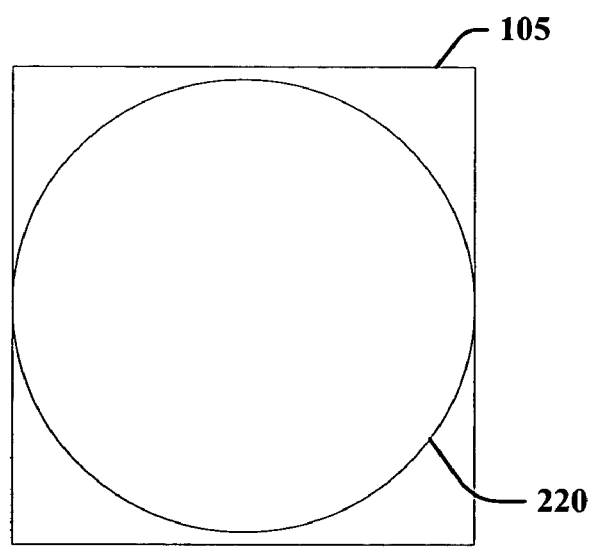

In various embodiments, a latitude, longitude, radius, and/or elevation may be associated with the satellite image map 110 displayed within viewing window 105. This geospatial information can be used by the web site system to define a search region when searching for real estate service providers. Various search region geometries are possible. Some example geometries are shown in FIGS. 2A-B. FIG. 2A shows a circular search region 210 that encompasses the rectangular region displayed in viewing window 105. FIG. 2B shows a circular search region 220 that is encompassed by the rectangular region displayed in viewing window 105. Another exemplary geometry is a rectangular region that corresponds to the rectangular region displayed in viewing window 105.

The center of the satellite image map 110 displayed in viewing window 105 has an associated latitude and longitude that, along with a radius, can define a circular search region encompassing the region shown in viewing window 105. Radius information can be determined in several ways. One example is by calculation of the distance from the center point of viewing window 105 to any of its corners. Another way to determine the latitude and longitude of the boundaries of the satellite image 110 displayed in viewing window 105 is by determining the elevation of the plane of the viewing window 105 above the satellite image map 110. The latitudinal and longitudinal bounds of the displayed satellite image 110 can then be calculated using the elevation and the known boundary dimensions of viewing window 105.

In web page 100, sector 120 is reserved for displaying real estate service provider information to the user. In the embodiment shown, an advertisement for a mortgage broker is displayed in sector 120. In one alternative, sector 120 can display a ranked list of real estate service providers that are active in the displayed satellite image map 110. The web page layout is, of course, not limited to the embodiment shown in FIG. 1. Many variations are possible.

Figure 3:
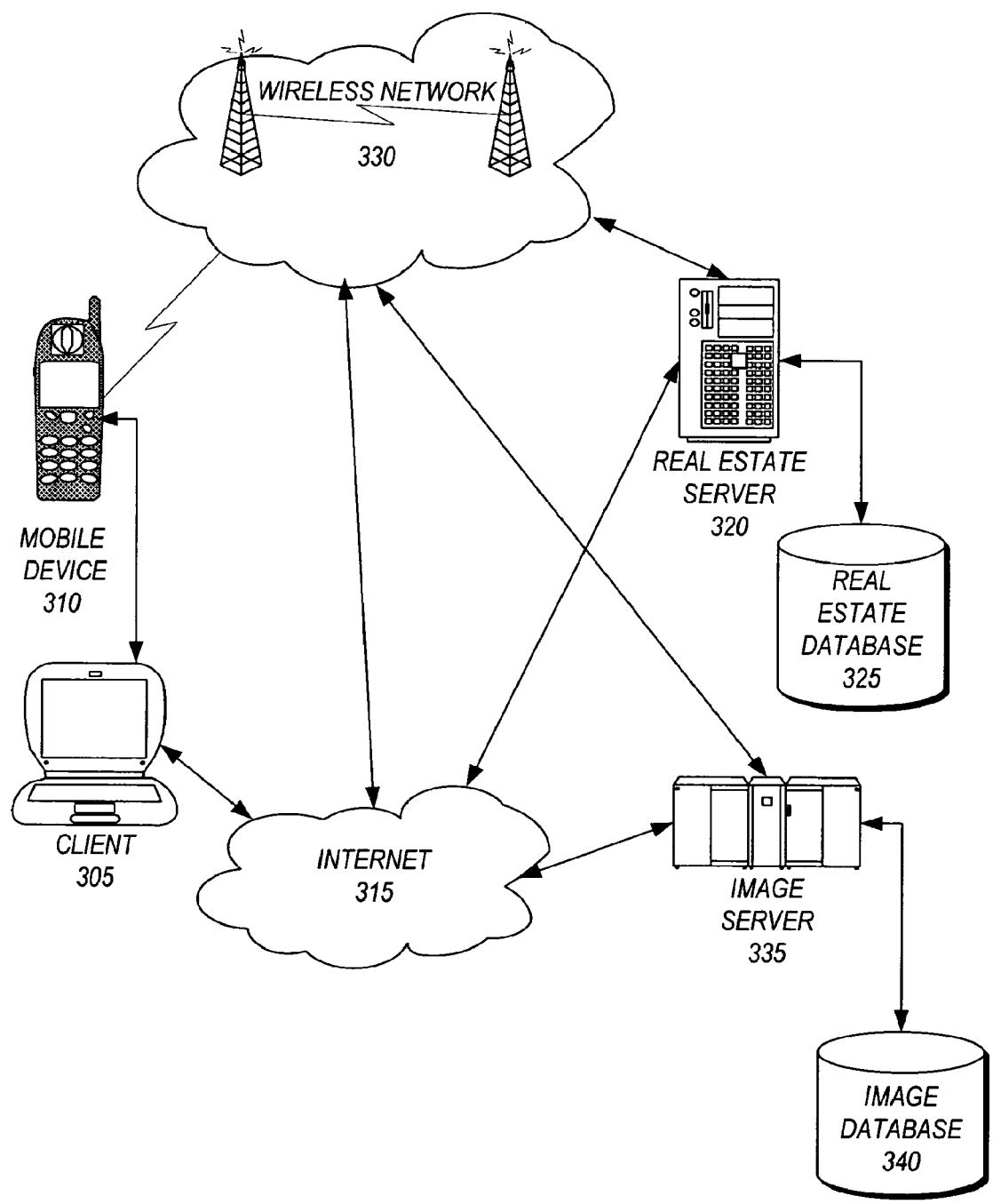
FIG. 3 shows an environment for one embodiment of the invention.

FIG. 3 shows a block diagram of a network suitable for implementing an embodiment of the invention. A client device 305 communicates over a network, such as the Internet 315, to a real estate server 320 and an image server 335. Real estate server 320 can access real estate database 325 to search real estate data records such as, for example, those associated with real estate service providers. Image server 335 can access image database 340 to obtain aerial images such as satellite image tiles. In some embodiments, the aerial image 110 is a single image. In others, aerial image 110 is assembled from image tiles obtained from the image database 340. This assembly can occur in the network, such as at the image server 340, or in the client device 305.

The client device 305 displays and interacts with the real estate web site by way of software applications such as web browsers and other client software that reside in memory of the client device 305. The geospatial calculation algorithms may reside in the client software, the server software, or a combination of the two. The real estate web site typically includes many web pages and generally resides on the real estate server 320.

A client device 305 with wireless communication capability can communicate wirelessly with a wireless network 330. The client device 305 may communicate directly with the wireless network, such as through a cellular or WLAN modem, or indirectly through an intermediary device such as mobile device 310. Some examples of suitable wireless technologies are wireless local area networks (WLAN) such as IEEE 802.11, Bluetooth, cellular, multi-hop, ultra-wideband (UWB), and broadband wireless (WiMAX) such as IEEE 802.16.

Figure 4:
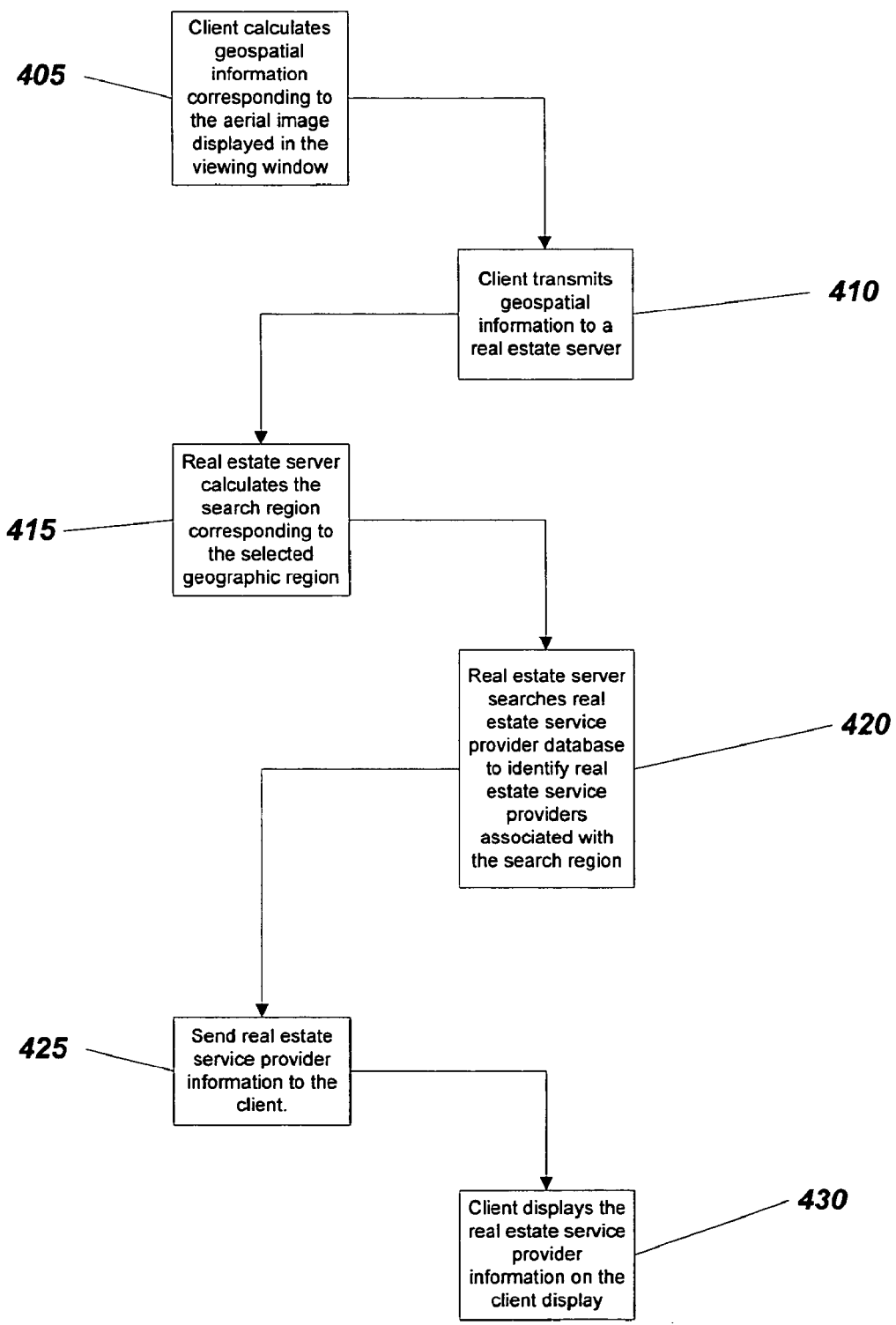
FIG. 4 shows a flow diagram of an embodiment of a method of searching for real estate service provider information via an aerial image map.

FIG. 4 shows a flow diagram of an embodiment of a method of searching for real estate service provider information via an aerial image map. In 405, the client device 305 calculates geospatial information such as latitude, longitude, and/or elevation corresponding to the aerial image 110 displayed in viewing window 105 of the web page 100. As discussed above, the determination of geospatial information can occur in the client device 305 or in a network entity such as real estate server 320. In 410, the client device transmits the geospatial information over the Internet 315 to real estate server 320.

In 415, real estate server 320 determines a search region from the geospatial information. The search region generally corresponds to the geographic region displayed in viewing window 105. In 420, once the search region has been determined, the real estate server 320 searches the real estate database 325 for real estate service provider data associated with the search region.

In 425, the real estate server 320 sends the search results to the client device 305. In 430, the client device 305 displays the real estate service provider information to the user on the client device's display. Alternatively, the real estate server 320 could transmit the search results to the user's email account or fax machine. In another embodiment, the real estate server 320 can transmit a service provider's contact information, such as a phone number or email address, to the user's mobile device 310. Short Messaging Service (SMS) is one suitable means for transmitting such information to the user's mobile device 310.

Optionally, the real estate server 320 or client device 305 may rank or categorize the search results based on predetermined criteria. The predetermined criteria can take into account, for example, how active a service provider is in the search region; how long it has been since the service provider's last activity in the region; the types of services provided; feedback from customers of the service provider; timeliness of service (e.g., how long an agent's average listing is on the market, how long it takes a painter to provide an estimate, etc.); and the types of properties handled by the service provider (e.g., whether an agent specializes in high-end homes).

Figure 5:
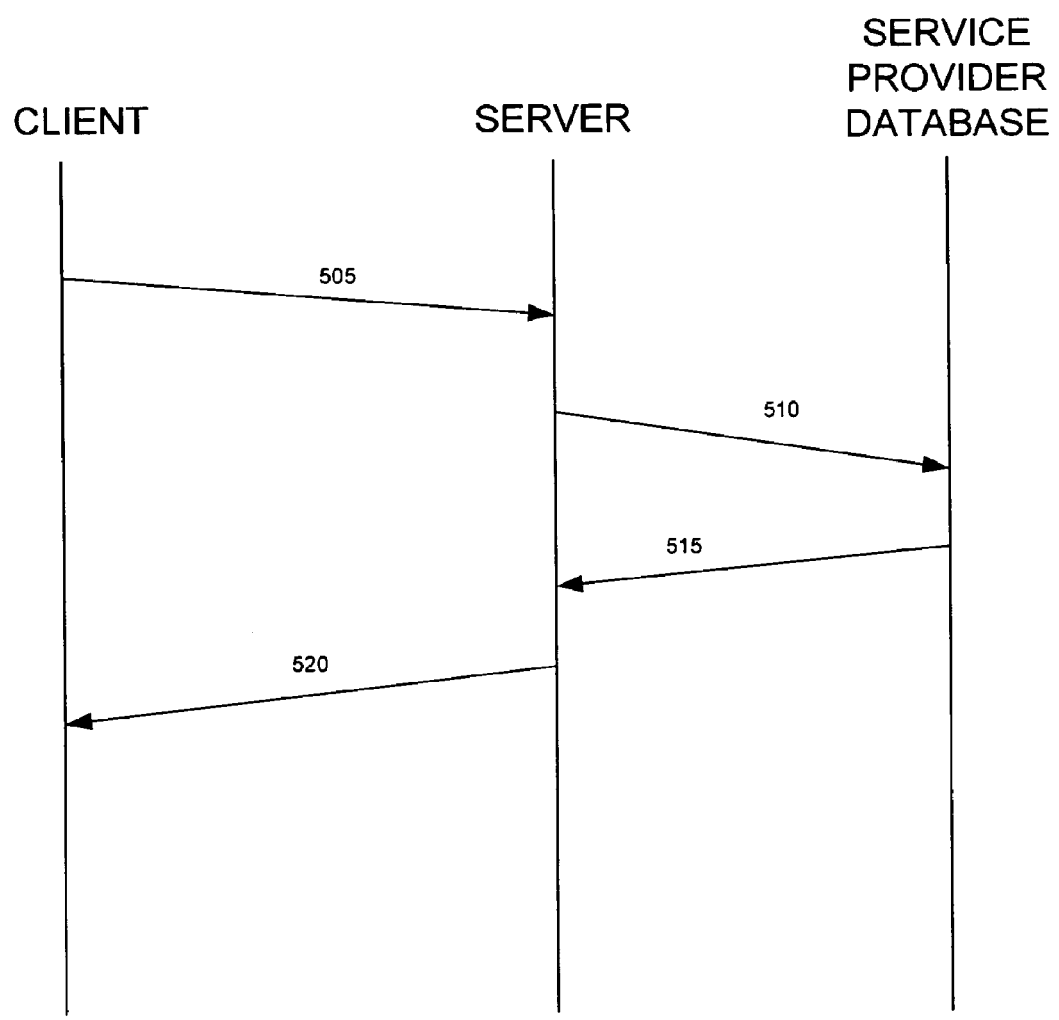
FIG. 5 shows a signal diagram according to the method shown in FIG. 4.

FIG. 5 shows a signal diagram according to the embodiment shown in FIG. 4. At 505, the client device 305 transmits information to the real estate server 320. The information can be geospatial coordinates (e.g., latitude, longitude, etc.) or any other suitable information that enables the server 320 to determine a search region in which to search for real estate service providers. Often the information transmitted in 505 enables the server 320 to determine what region is currently being displayed to the user in the web page's viewing window 105 on the client device's display.

At 510, the real estate server 320 transmits a service provider search query to the real estate database 325. The search query parameters may specify a search region, the type of service desired (e.g., real estate agent, home inspector, mortgage broker, etc.), or any other suitable parameter. At 515, the search results are returned to server 320 from the real estate database, 325.

At 520, the real estate server 320 sends the search results to the client device 305. The search results may be ordered, ranked, or prioritized by the real estate server 320 or by the client device 305 according to predetermined criteria. For example, the results from a search for a real estate agent who is active in the area displayed in the viewing window 105 could be ordered based on the number of sales closed by the agent in the area. As another example, the results of the agent search could be ranked based on which agent has had the most recent property closing in the area.

Figure 6A:
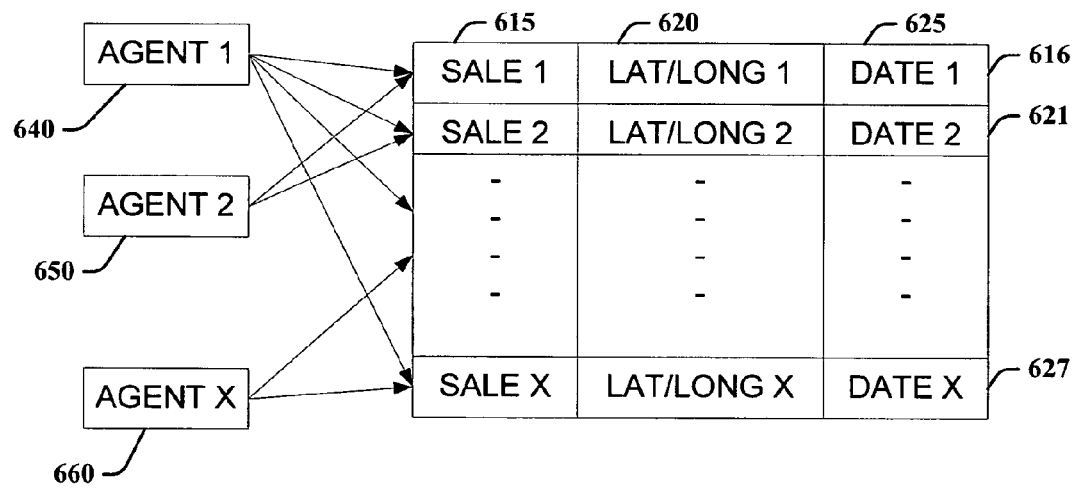
FIGS. 6A-B show a data architecture and data structure according to various embodiments of the invention.

FIG. 6A shows a data architecture suitable for use with some embodiments of the disclosed invention. Data table 610 has data entries arranged in rows 616, 621, 627 and columns 615, 620, 625. The data in each row is associated with a property sale and, as such, may be useful for identifying real estate agents based on closed sales. Column 615 contains property identifiers. Any suitable property identifier can be used. Some examples are street addresses, generic sequential numbering (e.g., 1, 2, 3, etc.), tax parcel identifiers, and MLS numbers. Column 620 contains geospatial coordinates for the property (e.g., latitude and longitude). Column 625 contains closing dates for each transaction. Thus, accessing data table 610 at row 616 would give a property identifier, geospatial coordinates, and closing date for a home sale.

Real estate service provider identifiers 640, 650, 660 may uniquely identify a real estate agent or group of real estate agents (i.e., a real estate agency). The service provider identifiers point to the transactions in data table 610 with which the real estate service provider is associated.

Several real estate service providers may be associated with the same transaction. For example, if real estate agent 1 (identifier 640) was the buyers agent for real estate sale 1 (row 616, col. 615) then identifier 640 would be associated with (i.e., point to) row 616. If real estate agent 2 (identifier 650) was the seller's agent (i.e., the listing agent) for real estate sale 1 (row 616, col. 615), identifier 650 would be associated with row 616. Similarly, the home inspectors, contractors, mortgage brokers, and lenders who provided real estate related services during real estate sale 1 could be associated with the sale.

Figure 6B:
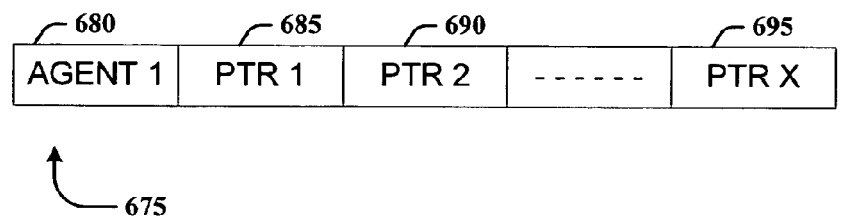

FIG. 6B shows a data structure suitable for use with the architecture and data table 610 embodiments shown in FIG. 6A. The data structure 675 is a linked list that has a header data field for the service provider identifier 680, followed by data fields for pointers to rows (i.e., transactions) in data table 610. The pointers from each element of the linked list to the next element have been omitted for ease of explanation. A database entry 675 for agent 1 would include pointers 685, 690, 695 to each real estate transaction with which she has been involved. Thus each transaction with which the agent has been involved can be searched to verify whether it satisfies the parameters of the search request 510 from real estate server 320.

Figure 7:
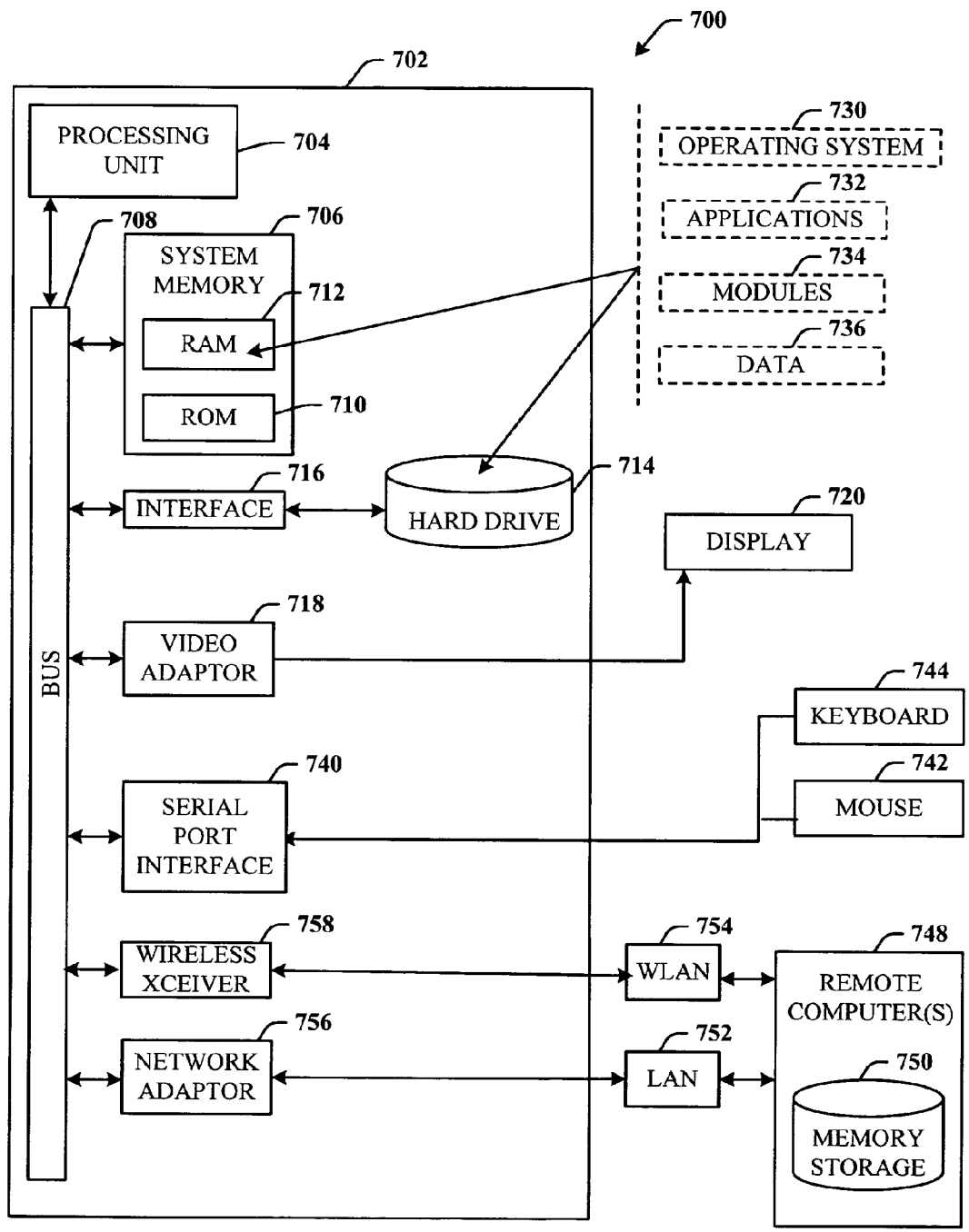
FIG. 7 shows a block diagram of an embodiment of a computer system suitable for use with the disclosed inventions.

FIG. 7 shows a block diagram of a computer 702 in order to provide additional context for various aspects of the present invention. FIG. 7 and the following discussion are intended to provide a brief, general description of a suitable computing environment 700 in which various aspects of the disclosed invention may be implemented. Those skilled in the art will recognize that the invention also may be implemented as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, handheld computing devices, microprocessor-based or programmable consumer electronics, and the like, each of which may be operatively coupled to one or more associated devices. Aspects of the disclosed inventions may also be practiced in distributed computing environments where certain tasks are performed by remote processing devices that are linked through a communications network. In a distributed computing environment, program modules may be located in both local and remote memory storage devices.

FIG. 7 shows an exemplary environment 700 for implementing various aspects of the disclosed inventions that includes a computer 702, the computer 702 including a processing unit 704, a system memory 706 and a system bus 708. The system bus 708 couples system components including, but not limited to, the system memory 706 to the processing unit 704. The processing unit 704 may be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read only memory (ROM) 710 and random access memory (RAM) 712. A basic input/output system (BIOS) is stored in a non-volatile memory 710 such as ROM, EPROM, EEPROM. A BIOS contains the basic routines that help to transfer information between elements within the computer 702, such as during start-up.

The computer 702 further includes a hard disk drive 714. The hard disk drive 714 can be connected to the system bus 708 by a hard disk drive interface 716. The removable storage drives (DVD drives, floppy drives, etc.) are not shown for clarity. However, the removable storage drives and their associated computer-readable media provide nonvolatile storage of data, data structures, and computer-executable instructions for implementing the inventions described herein. For the computer 702, the drives and media accommodate the storage of information input by a user, or received from a remote computer, in a suitable digital format. Although the description of computer-readable media above refers to a hard disk, a removable magnetic disk, and a DVD, a person of ordinary skill in the art understands that other types of storage media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

Software applications can be stored in the drives and RAM 712. These applications can include an operating system 730, one or more application programs 732, (e.g., web browsers and client applications, etc.) other program modules 734 (e.g., cookies, etc.) and program data 736. All or portions of the operating system, applications, modules, and/or data can also be cached in the RAM 712.

Embodiments of the invention can be implemented with various commercially available operating systems or combinations of operating systems.

A user can enter commands and information into the computer 702 through a keyboard 744 and a pointing device, such as a mouse 742. For example, the user might employ the mouse to navigate the viewing window 105 over the aerial map 110. Other input devices (not shown) may include a microphone, an IR remote control, a joystick, a game pad, similar devices. These and other input devices are often connected to the processing unit 704 through a serial port interface 740 that is coupled to the system bus 708, but may be connected by other interfaces, such as a parallel port, a game port, a universal serial bus ("USB"), an IR interface, a wireless transceiver 758, etc. A monitor 720 or other type of display device is also connected to the system bus 708 via an interface, such as a video adapter 718. In addition to the display 720, a computer typically includes other peripheral output devices (not shown), such as speakers, printers, etc., that can present information to the user.

As shown in FIG. 3, the computer 702 may operate in a networked environment using logical connections via wired and/or wireless communications to one or more remote computers, such as a remote computer(s) 748. The remote computer(s) 748 may be a workstation, a server computer, a router, a personal computer, portable computer, microprocessor-based entertainment appliance, a peer device or other common network node, and typically includes many or all of the elements described relative to the computer 702, although, for purposes of brevity, only a memory storage device 750 is illustrated. The logical connections depicted include a local area network (LAN) 752 and a wide area network (WAN) 754. Such networking environments are commonplace in homes and businesses. The Internet can also be used to provide access to remote computer 748.

When used in a LAN networking environment, the computer 702 is connected to the local network 752 through a wired or wireless communication network interface or adapter 756. The adaptor 756 may facilitate wired or wireless communication to the LAN 752. When used in a WAN networking environment, the computer 702 typically is connected to a communications server on the LAN, or has other means for establishing communications over the WAN 754, such as the Internet. In a networked environment, program modules depicted relative to the computer 702, or portions thereof, may be stored in the remote memory storage device 750. The network connections shown are exemplary and other means of establishing a communications link between the computers may be used.

The computer 702 is operable to communicate with any other devices having wireless communication capability, e.g., a cell phone, a printer, desktop and/or portable computer, portable data assistant, and telephone. As discussed briefly above, suitable wireless technologies may include, but are not limited to, cellular, WLAN (e.g., IEEE 802.11), IEEE 802.16, IEEE 802.20, and Bluetooth™.

IEEE 802.11 is a wireless communication protocol that enables computers to send and receive data anywhere within the range of a base station. A WLAN can be used to connect computers to each other, to the Internet, and to wired networks (which may use IEEE 802.3 or Ethernet communication protocols).

Aspects of the invention described above may be stored or distributed on computer-readable media, including magnetic and optically readable and removable computer discs, as well as distributed electronically over the Internet or over other networks (including wireless networks). Those skilled in the relevant art will recognize that portions or embodiments of the invention may also reside in a fixed element of a communication network such as a server or database, while corresponding portions may reside on a mobile communication device, such as a laptop computer, Personal Digital Assistant ("PDA"), or mobile phone. Data structures and transmission of data particular to aspects of the invention are also encompassed within the scope of the invention.

In accordance with the practices of persons skilled in the art of computer programming, embodiments of the invention are described with reference to acts and operations that are performed by computer systems. Such computer-executed acts and operations may be performed by an operating system or an application program. The acts and operations include the manipulation by the CPU of electrical signals representing data bits and the maintenance of data bits at memory locations to operate the computer systems and process signals. The memory locations where data bits are maintained are physical locations that have particular electrical, magnetic, or optical properties corresponding to the data bits.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the embodiments described herein. These and other changes can be made to the invention in light of the detailed description.

Aspects of the invention can be modified, if necessary, to employ the systems, functions and concepts of the various references described above to provide yet further embodiments of the invention.

These and other changes can be made to the invention in light of the above detailed description. In general, the terms used in the following claims should not be construed to be limited to the specific embodiments disclosed in the specification, unless the above detailed description explicitly defines such terms. Accordingly, the actual scope of the invention encompasses the disclosed embodiments and all equivalent ways of practicing or implementing the invention under the claims.

In view of the many possible embodiments to which the principles of this invention may be applied, it should be recognized that the detailed embodiments are illustrative only and should not be taken as limiting the scope of the invention. For example, although the viewing window 105 geometry has been primarily discussed above as a rectangular region, a person of ordinary skill in the art understands that other geometries may be used. For instance, circular viewing windows may be appropriate for some embodiments. As another example, many types of data architectures and data structures are appropriate for various embodiments of the invention. Thus, I claim as my invention all such embodiments as may come within the scope and spirit of the following claims and equivalents thereto.

The embodiments of the invention in which an exclusive property or privilege is claimed are defined as follows:

1. A method, embodied in a computer system, of presenting real estate service provider information to a user, the method comprising:
    displaying, in a viewing window of a web page on a client computer display, user-selectable aerial image of a geographic region;
    generating a search request, the search request being automatically generated in response to user selection of the aerial image and having geospatial information defining the geographic region;
    identifying, based on the geospatial information and without identifying a specific property, real estate service providers that have provided real estate services within the geographic region;
    transmitting information associated with the identified real estate service providers to the client computer; and
    presenting the real estate service providers, on the web page displayed on the client computer, according to at least one of: amount of real estate service activity in the geographic area, and time since most recent activity in the geographic area, wherein the preceding steps are performed by at least one processor.

2. The method of claim 1, wherein the geospatial information comprises elevation information associated with the viewing window.

3. The method of claim 1 wherein the geospatial information comprises latitude and longitude associated with the displayed satellite image.

4. The method of claim 3, wherein the latitude and longitude are associated with the center point of the displayed satellite image.

5. The method of claim 1 in which identifying real estate service providers comprises searching a real estate database having historical real estate service provider information.

6. The method of claim 1 in which the real estate service provider is a real estate agent.

7. The method of claim 1 in which the real estate service providers are further ranked according to client feedback about the service provider.

8. At least one non-transitory computer-readable medium on which are stored instructions that, when executed by at least one processing device, enable the at least one processing device to perform a method comprising the steps of:
    displaying, in a viewing window of a web page on a client computer display, a user-selectable aerial image of a geographic region;
    generating a search request, the search request being automatically generated in response to user selection of the aerial image and having geospatial information defining the geographic region;
    identifying, based on the geospatial information and without identifying a specific property, real estate service providers that have provided real estate services within the geographic region;
    transmitting information associated with the identified real estate service providers to the client computer; and
    presenting the real estate service providers, on the web page displayed on the client computer, according to at least one of: amount of real estate service activity in the geographic area, and time since most recent activity in the geographic area.

9. The medium of claim 8, wherein the geospatial information comprises elevation information associated with the viewing window.

10. The medium of claim 8 wherein the geospatial information comprises latitude and longitude associated with the displayed satellite image.

11. The medium of claim 10, wherein the latitude and longitude are associated with the center point of the displayed satellite image.

12. The medium of claim 8, wherein identifying real estate service providers comprises searching a real estate database having historical real estate service provider information.

13. The medium of claim 8, wherein the real estate service provider is a real estate agent.

14. The medium of claim 8, wherein the real estate service providers are further ranked according to client feedback about the service provider.

* * * * *